414-685 SR
OR X 6,253
2 Sheets. Sheet 1.
Webber & Hartshorn,
Turning Irregular Forms.
No. 6,253. Patented Apr. 3, 1849.
Fig 1
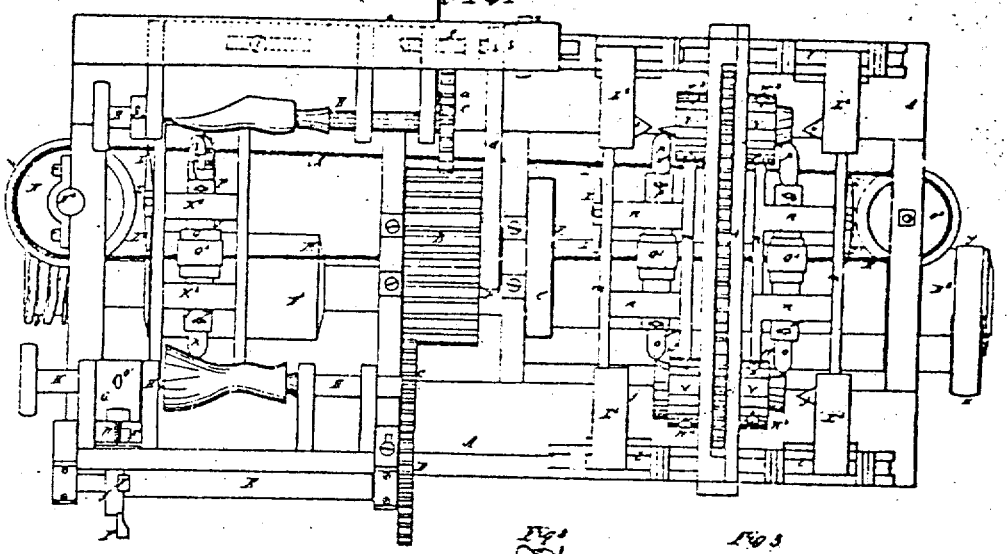
Fig 4
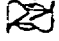
Fig 3
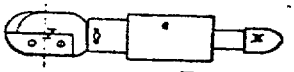
Fig 2
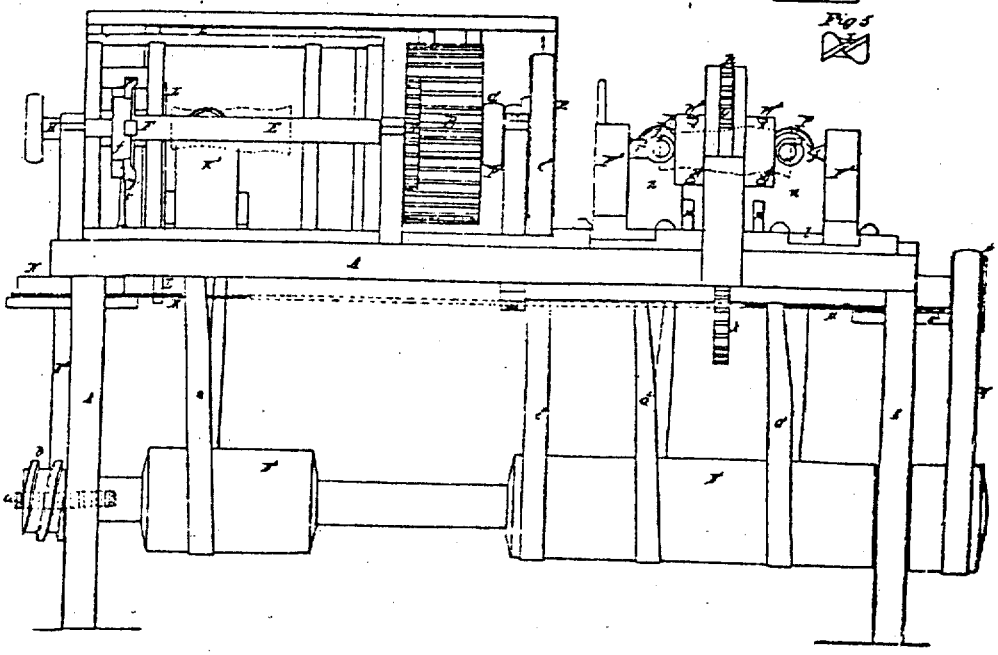
Fig 5

2 Sheets. Sheet 2.

Webber & Hartshorn,

Turning Irregular Forms.

No. 6,253. Patented Apr. 3, 1849.

UNITED STATES PATENT OFFICE.

ELBRIDGE WEBBER AND C. HARTSHORN, OF GARDINER, MAINE.

MACHINERY FOR TURNING LASTS, &c.

Specification of Letters Patent No. 6,253, dated April 3, 1849.

*To all whom it may concern:*

Be it known that we ELBRIDGE WEBBER and CHARLES HARTSHORN, of the town of Gardiner, in the county of Kennebec and State of Maine, have invented a new Mode of Turning Lasts and other Irregular Figures from Reverse Patterns, which is described as follows, reference being had to the annexed drawings of the same, making part of this specification.

Figure 6:
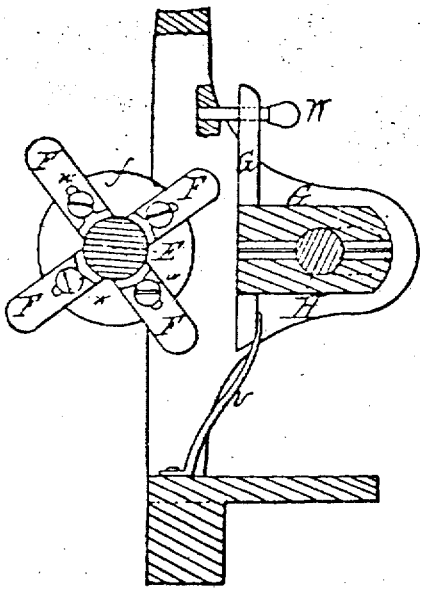
Figure 7:
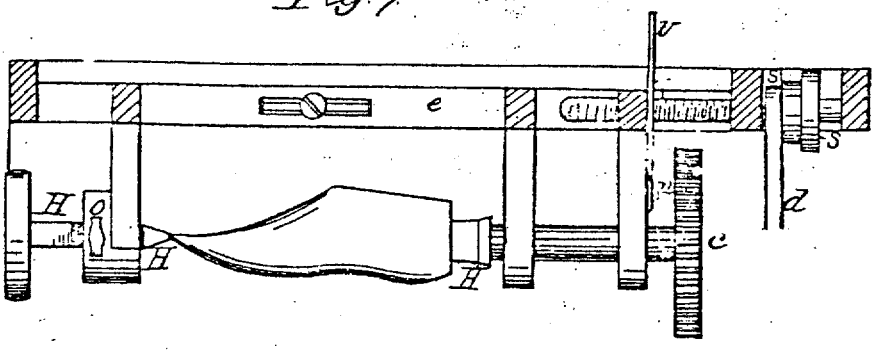

Figure 1, is a bird's eye view of the machine. Fig. 2 is a side elevation of the machine. Fig. 3, is a plan of the cutters, stock, pulley, and gage rod. Fig. 4, is a section on the dotted line $x$ $x$ of Fig. 3. Fig. 5, is an end view of the cutters. Fig. 6 is a vertical section showing the pawl wheel and adjustable pawls and sliding box, upon which they operate. Fig. 7 is a horizontal section showing the sliding carriage, screw, cone pulley, &c.

Similar letters in the several figures refer to corresponding parts.

The nature of our invention and improvement consists in turning regular, irregular, and plain figures, such as shoe lasts, gun stocks, oars, busts, plates, signs, letters fluted columns and an infinite variety of forms from reverse patterns, or forms, that is to say from patterns of a reverse form, to that of the article to be turned, producing a depression or cavity directly opposite a corresponding protuberance or swell on the pattern over which the friction gage rod of the cutter stock passes as the latter simultaneously rotates on its axis, and traverses to the right and to the left, as the friction gage rod passes over the protuberances and hollows of the pattern in moving the carriage; carrying the cutter longitudinally in a straight line between the pattern and block of wood or other article to be shaped; and in so adapting the several parts of the machine that during the operation of turning, say a last, the size and taper of the toe may be varied and likewise graduated to conform to the fashion, and different lengths of lasts may be turned from the same patterns by increasing or diminishing the longitudinal movement of the carriage containing the block of wood, while turning from the same pattern, and finishing the heel and toe, and also adapting the machine to the performance of various kinds of cutting and turning signs; and carving busts from reverse patterns by a very slight modification of several parts of the machine; positive forms producing reverse forms; and the essential parts of the machine moving in straight lines—being an improvement on Thomas Blanchard's system of turning, which is performed by a pattern centered in a lathe moving in the arc of a circle for producing a like form of variable proportion—said system being defective on account of the cutters producing a protuberance when the pattern and block in the lathe swing in the arc of a circle above the center of the cutter wheel, and producing a depression when it swings below the center, rendering much shaving and trimming necessary after the article has been turned. In Blanchard's machine like form must be produced from like form, of the same size, or of different proportions. In our machine like forms cannot be produced from like forms. A convex pattern produces a concave form and vice versa.

We make a pattern by centering a form, say a last, and block of wood on parallel centers and bring the convex ends of the gage rod of the cutter stock against the last and the opposite end which contains the cutters against the block of wood and the machine being operated will produce a reverse pattern. Then by reversing the position of the gage rod and cutters any required number of lasts may be produced from the pattern thus formed, the right side of the reverse pattern turning the left side of the last. This we call turning from a reverse pattern and constitutes the gist of our invention and is what we wish to secure by Letters Patent. This principle of turning from reversed forms may be applied to the producing of almost every kind of form, and by means of a great variety of combination of mechanical devices; but as we intend to confine this application to a certain combination for producing shoe lasts, oars, gun stocks, and other articles of like character, shall merely give a description of this part of the machinery; at the same time premising by stating that the machinery, with very slight modifications, may be easily adapted to the various kinds of turning or producing forms, figures, lettering &c., as above stated.

*Description:* A represents the frame is to be produced and the reverse pattern last.

C C are cog wheels on the centers H H to which the block and pattern are secured, caused to revolve simultaneously in opposite directions by being geared to the aforesaid long pinion B.

*e* Figs. 1 and 7 is a sliding frame, or carriage containing the centering axles H H to which the article being turned is secured, and an endless strew on which is secured a cone pulley for moving the frame or carriage *e* and centering stock and block of wood during the operation of turning for increasing and diminishing the length of the last, or other article under the operation of the cutters.

D is a cog wheel meshing into a cog wheel C; attached to shaft E is a pawl wheel *f* to which the pawls F are attached for varying the size of the toe of the last while turning.

G represents a sliding box through which the center H (that secures the toe of the pattern) passes, moved up by the pawls F F and back by the spring *v*.

W is a screw to regulate the movement of the sliding box G. *w* are set screws for holding the pawls with their ends at the required distance from the center of the wheel to produce the required motion to graduate the size to conform to the fashions.

I are the cutters for cutting the material while turning. These cutters are made in the form of two spiral cutters each tapered to a point and affixed to the small ends of a cone—each cutter operating on the principle of a gage.

J is the rotating sliding socket stock into one end of which the shank of the cutters is inserted.

P is a screw for holding the shank of the cutters firmly in the stock J.

K is the gage rod—one of its ends (that which is opposite the cutters) being inserted into the stock J and held by a screw P′—the other end being made convex and smooth for rubbing against the surface of the pattern as it rotates and traverses to the right and left, moving the cutter back and forward causing it to cut reverse from the pattern. The socket in each end of the stock is made of sufficient depth to admit the shanks of the cutting instrument and gage rod to be inserted to any required depth for varying the sizes of the lasts, or other articles to be turned.

Q is a pulley on the rotating stock for driving the cutters and gage rods. The band $Q^2$ that passes round this pulley also passes round the drum $D^2$.

$K^2$ is a sliding carriage in which the rotating and sliding stock is placed.

M is an endless chain passed around a one at each end of the frame for moving the carriage with the cutters and gage rod longitudinally between the pattern and last.

*a* is a cog wheel on the shaft $N^2$ of the propelling pulley N of the endless chain.

*b* is a spiral thread or screw on the shaft of the main drum geared with the cog wheel *a* for moving the endless chain.

L is a lever for unshipping the chain from the carriage or attaching the same to it; O set screws to secure the centers H in their stocks.

R is a driving pulley to drive the long pinion, having a band $C^2$ around it leading from the main drum. S, S, cone pulleys of various diameters, and *d* band leading from said cone pulleys to the pulley $P^2$ on the shaft of the long pinion B to drive the feed screw T and with it the frame *e* at various degrees of speed. The object of this part of the mechanical arrangement is to turn different lengths from the same pattern by moving the carriage containing the block of wood longitudinally at various degrees of speed.

U is a lever plate attached by a pin to the carriage *c* and dropping edgewise into the thread of the screw T for feeding. The long pinion B must be made of sufficient length to allow the pinion C to slide back and forth without getting out of gears as the carriage *e* traverses to the right and left.

V V are two revolving hollow cylinders to hold the last and pattern whilst finishing the heel and toe of the last.

$W^2$ $W^2$ $W^2$ are set screws to secure the last and pattern, whilst the last is being finished.

*g*, *g*, are cog wheels on the hollow cylinders V, V, and *h* is a cog wheel arranged between them and into which they mesh for turning the said cylinders.

*k* is a cog wheel on a horizontal shaft meshing into cog wheel *h* propelled by a pulley and band *y* leading to the main drum $D^2$. The centers *i i j j* for centering the last and pattern previous to being secured in the cylinders are made and arranged on the same principle as those above described. They are arranged in stocks $L^2$ affixed to slides *l* moving in grooves in the frame and are removed out of the way of the operation of the cutters during the operation of dressing the heels and toes. The carriage *m m*, bolsters *n n*, gage rod *o o*, and cutters *p p* are arranged between the last block and reverse pattern as before. The carriages containing the cutters and gage rods are attached to the endless chain by the lever L in such manner as to move in contrary direction; that is to say, by attaching the carriages to the chain M by means of the lever L and hooks $L^2$ $L^2$ on the end of the lever L, by moving the upper end of the lever in the arc of a circle to the right or to the left and bringing the hook into a link of the chain pared in the manner above stated and duly centered and secured on the centers H H and the block of wood to be turned to the form of a last to other article being also centered and secured, the machine is put in motion by any convenient and adequate power applied to the main shaft. The drum, bands, and pulleys, cause the pattern block and stock with the gage rod and spiral cutters to revolve and the pulleys carrying the endless chain which moves the carriages connected thereto with the rotating spiral cutters between the pattern and block of wood to be turned, the end of the gage rod being pressed against the pattern by the twist of the band of the stock; and the pattern revolving in its centers causes the stock and cutters to move toward and from the centers of the block of wood to be turned and finished in the same sinuous line as that described by the line of the pattern, the spiral cutters paring down the block to the required form which will be the reverse of that of the pattern. The cutter must be of the form described and represented in Figs. 3 and 4 and 5 in order to perform this work. The cutters used in Blanchard's machine would not act in our machine.

In order to vary the fashions of the lasts to be turned by the same reverse form—that is to say to make the lasts longer, and narrower, or broader, and thicker, or thinner, at the point or toe without changing the pattern, an additional movement is required to be produced in the pattern and last; namely a horizontal alternate movement of one end of the reverse pattern toward and from the last simultaneously with its rotary movement and a longitudinal movement, of the last simultaneously with its rotary movement. The horizontal reciprocating movement of the toe end of the reverse pattern toward and from the last for varying the shape of the point or toe is produced by securing the pawls F (Fig. 6) in certain positions on the pawl wheel *f*. Two of the pawls are set and secured nearer the center of the pawl wheel than the remaining two palls which are at right angles to said first mentioned pawls. As the pawl wheel revolves the pawls strike againts the head G′ of the slide containing the center of the pattern and moves it horizontally with the end of the pattern affixed thereto toward the last, causing the cutters to move also toward the last which it pares down more or less according to the set of the pawls. The spring *v* keeps the head of the slide back in a proper position to be struck by the pawls as they revolve. The remaining center of the pattern to which the heel is affixed and the two centers of the last have no horizontal transverse movement toward the cutters. If the sides of the toe are to be made more ponited two of the pawls on the diameter of the pawl-wheel must be set out farther from the center and if the upper and under sides of the toe are to be reduced the two pawls at right angles to those just named must be set out farther. But if the last is to be made wider and thicker the pawls must be set in near the center of the pawl wheel. The screw W is to regulate the movement of the center H back or forward at pleasure during the operation of the machine by hand in order to cut more from one side of the last than from the other and to change the position of the toe-end of the pattern as may be desired and while the cutter is in operation. In order to increase the length of the last to be cut from the same pattern, the last must be moved longitudinally at the same time that it revolves on its center, a given distance during the time that the gage rod K is passing over the surface of the pattern from end to end and this longitudinal movement of the last-block is effected by causing the carriage *e* containing the centers of the last-block to move in an opposite direction from that of the cutter by means of the screw T turned by the cone pulley S and band *d*—the thread of which screw being made to act against a latch U attached to the carriage by a pin *u* on which it turns. By lowering the latch till it is in contact with the thread of the screw carriage will move. On raising the latch the carriage will cease to move. To increase the velocity of the carriage for producing a longer last the band *d* must be shifted to a smaller portion of the cone pulley on the screw shaft which will cause the screw to revolve a greater number of turns in a given time and consequently cause the carriage to move at a more rapid rate while the gage rod K is traversing the surface of the reverse pattern. The rotary motion of the last-block is kept up by the pinion C being constantly in gear with the long pinion B which is to be made of sufficient length to admit of the gear being unbroken during the longitudinal movement of the carriage. By these additional movements of the reverse pattern and last-block produced in the manner just described a great variety of fashions of lasts can be produced from a single reverse pattern, which renders this machine very valuable.

In order to increase or diminish the diameter of the article to be turned the cutters must be moved nearer to or farther from the pattern—by sliding the shank of the cutters in the stock and securing the same in any required positions by the set screw.

The before described principle of turning may be applied to cut figures in sections from reverse forms—and also smooth surfaces—varying the combination accordingly—and making use of a ratchet wheel to move the cog wheels on the revolving centers to which the pattern and block are affixed having an arrangement of shafts and cog wheels for the winding of chains attached to vertically sliding carriages placed on opposite sides of the main frame one containing the pattern and the other the article to be lettered or turned—the cutter and gage rod operating between them, having also a lever leading from the ratchet wheel to a trip lever—and a system of cone pulleys to alter the speed of the cutter and gage, the carriage being moved either by the endless chain or revolving slotted crank and pitman rod.

What we claim as our invention, and desire to secure by Letters Patent is—

1. The method of finishing the heel and toe of the last by holding the pattern and last in cylindrical holder and removing the centers and applying the cutters simultaneously to the toe and heel substantially as above described. We, however, do not claim the revolving cylindrical holders nor the mode of turning them as described.

2. We likewise claim the mode of varying the form or fashion of the last while turning, as described, by means of the adjustive pawls and pawl wheel combined with the machinery for operating the reverse pattern as herein set forth.

In testimony whereof we have hereunto signed our names before two subscribing witnesses.

ELBRIDGE WEBBER.
CHARLES HARTSHORN.

Witnesses:

NATHAN WHITMORE,
N. O. MITCHELL.